UNITED STATES PATENT OFFICE.

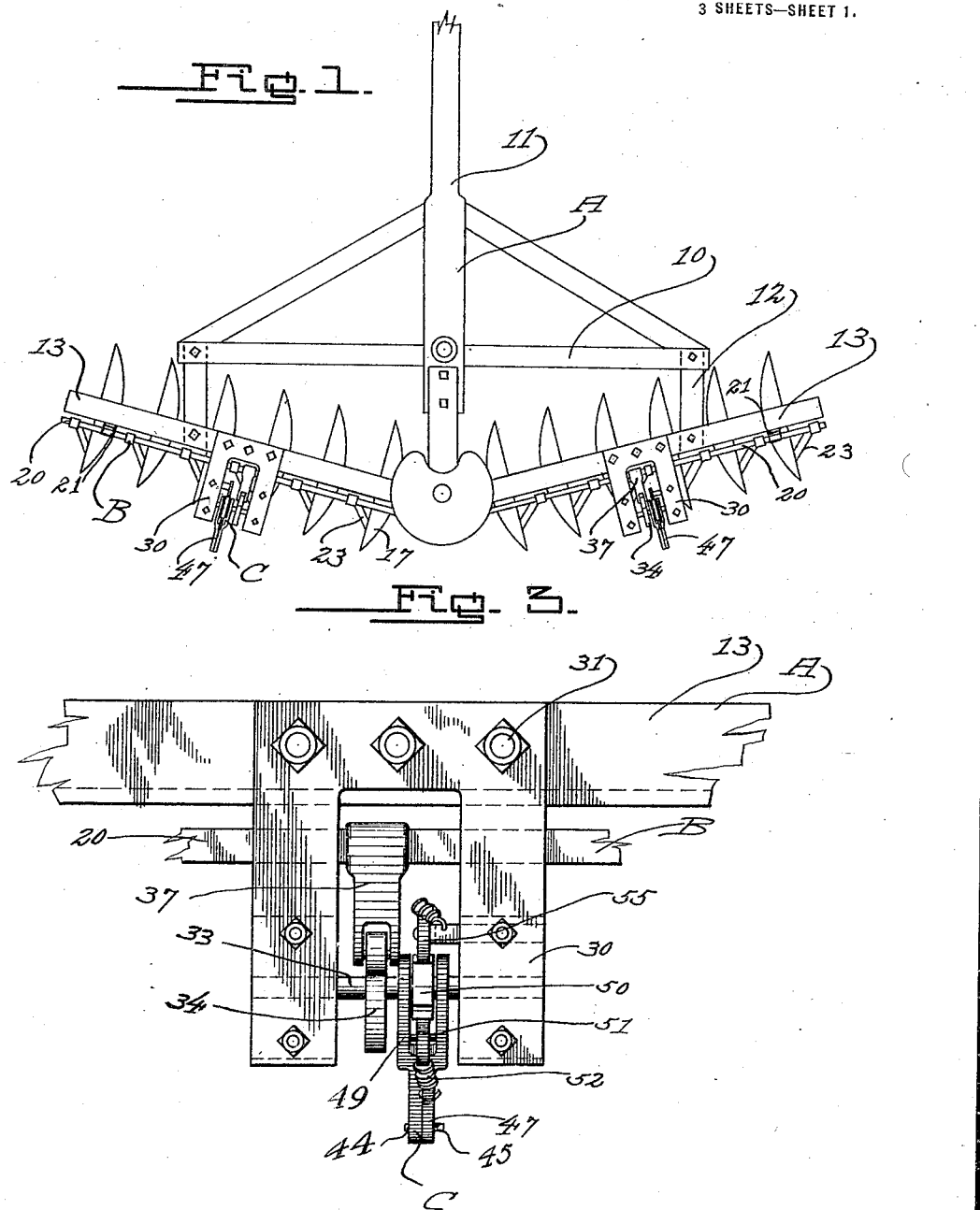

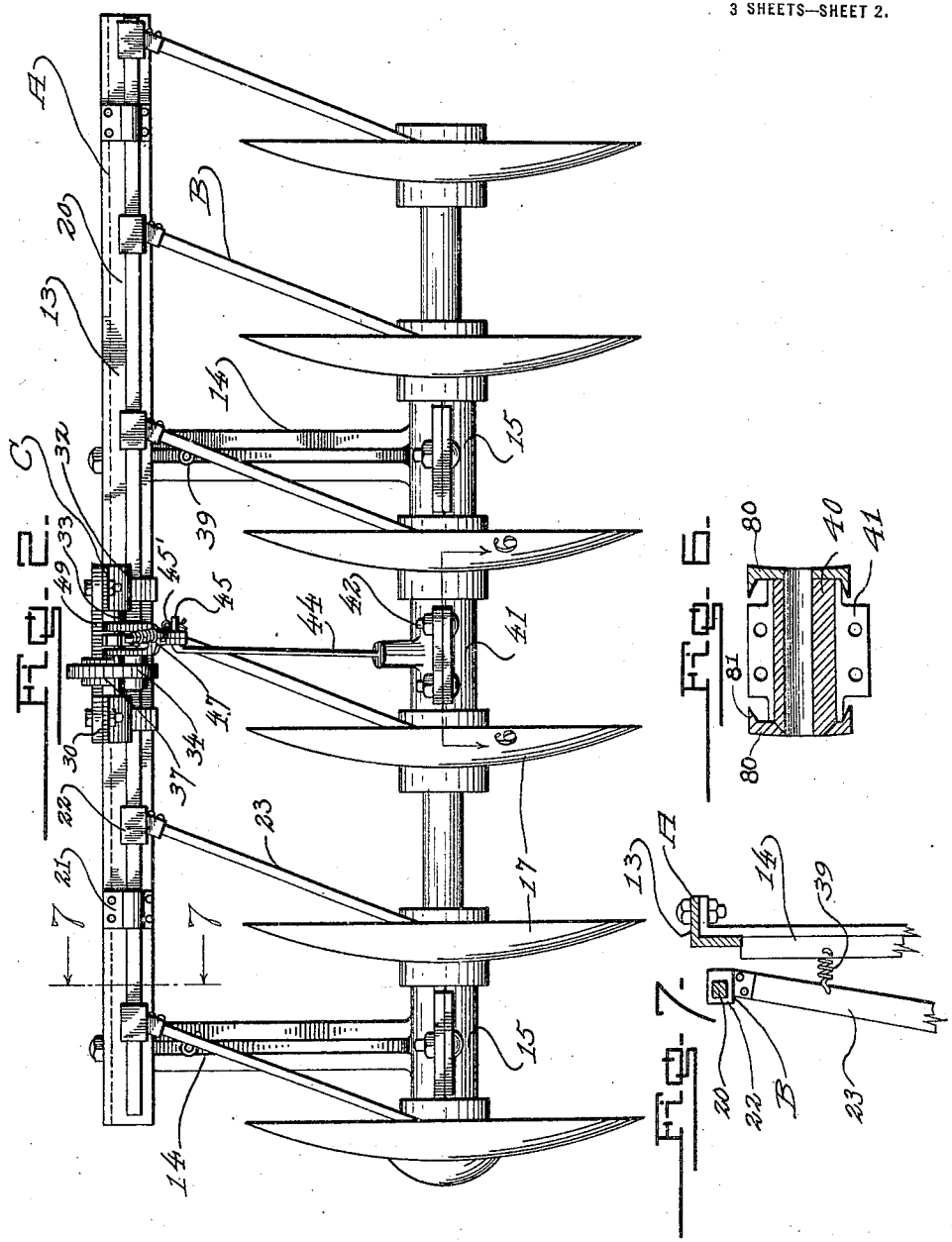

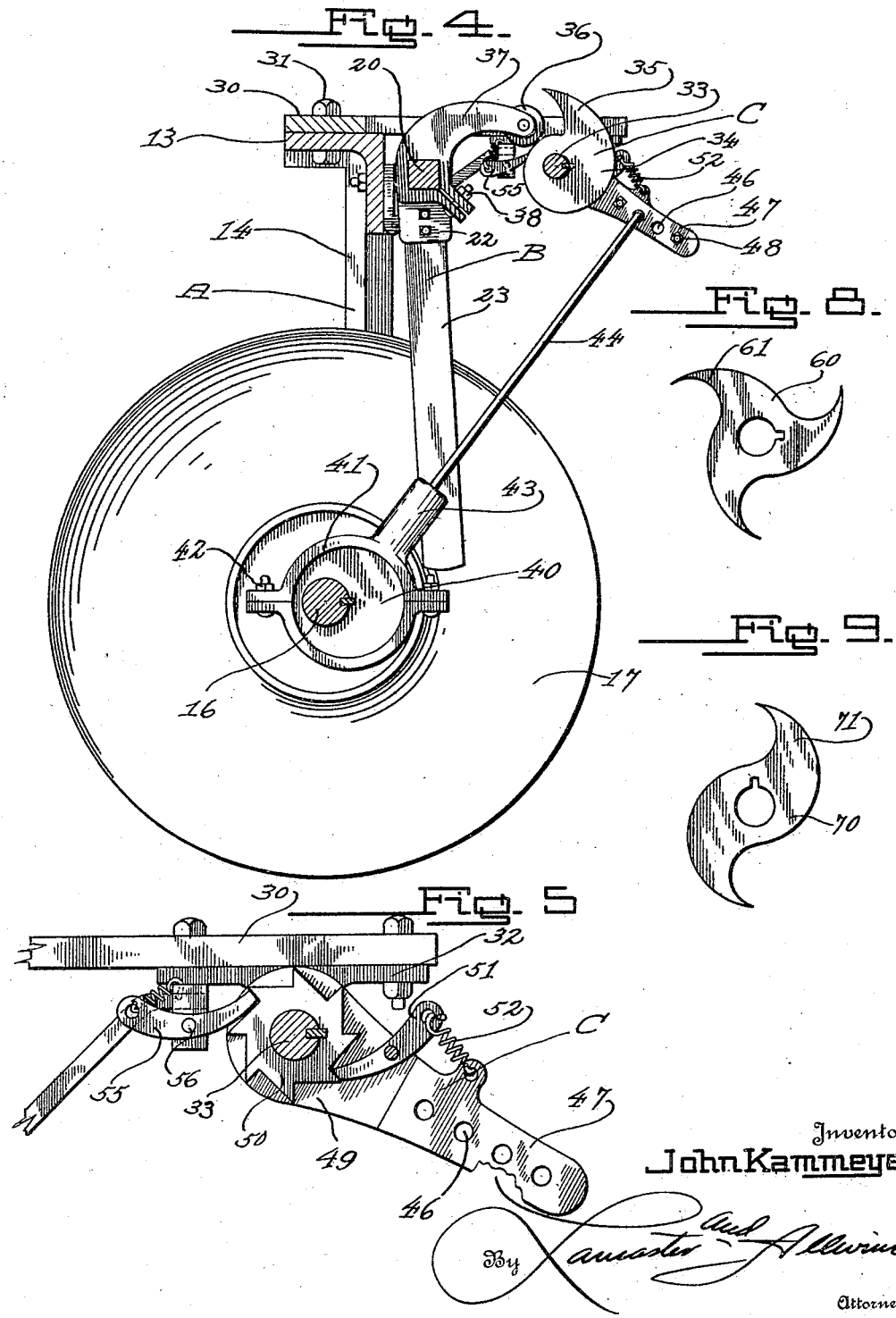

JOHN KAMMEYER, OF ALLISON, IOWA.

DISK SCRAPER FOR AGRICULTURAL MACHINES.

1,410,813.  Specification of Letters Patent.  Patented Mar. 28, 1922.

Application filed August 15, 1921. Serial No. 492,320.

*To all whom it may concern:*

Be it known that I, JOHN KAMMEYER, a citizen of the United States, residing at Allison, in the county of Butler and State of Iowa, have invented certain new and useful Improvements in Disk Scrapers for Agricultural Machines, of which the following is a specification.

This invention relates to disk harrows, and the like, and more particularly to a novel cleaner for the disks of the harrow and the primary object of the invention is to provide an improved device for automatically operating the scraping blades for the harrow disk, so as to effectively clean the disk and thereby permit the disk to give a clean cut with less power to pull the same.

Another object of the invention is the provision of a single operating means for actuating a gang of scraper blades, so that a gang of disks can be simultaneously kept clean and free from all dirt and trash.

A further object of the invention is to provide a novel operating means for the scraper blades of the disks of agricultural machines, in which the speed of operation of the scraper blades can be readily regulated or set according to the desires of the operator, or according to the nature of the soil over which the harrow or other agricultural machine is being operated, said operating means including a novel system of cams for actuating the scraper blades.

A further object of the invention is the provision of a gang of scraper blades rigidly secured to an oscillating shaft, said oscillating shaft carrying a rocker arm, which is adapted to be actuated by a cam, the same in turn being operated from the shaft which supports the disks.

A still further object of the invention is to provide an improved operating means for the scraper blades of disks of agricultural implements of the above character, which will be durable and efficient in use, one that will be simple and easy to manufacture, and one which can be placed upon the market and incorporated with any preferred type of disk agricultural machines, at a minimum cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a top plan view of a disk harrow, showing the novel disk scraper blade operating means incorporated therewith.

Figure 2 is an enlarged rear elevation of a gang of agricultural disks, showing the improved scraper blade and operating means incorporated therewith.

Figure 3 is an enlarged fragmentary plan view of the disk beam, showing the improved operating means incorporated therewith, and illustrating the manner of associating said operating means with the disk beam.

Figure 4 is an enlarged fragmentary section through a gang of harrow disks illustrating the improved invention operatively connected therewith.

Figure 5 is an enlarged fragmentary vertical transverse section through the operating means illustrating the arm for actuating the operating cam.

Figure 6 is a detail longitudinal section through the disk shaft, taken on the line 6—6 illustrating the means of connecting the actuating cam carried by the shaft.

Figure 7 is a detail vertical transverse section through a portion of the harrow beam and scraper, taken on the line 7—7 of Figure 2.

Figures 8 and 9 are detailed views of modified forms of cams, which can be utilized for operating the rocker arm of the scraper blades.

Referring to the drawings in detail, wherein similar reference characters designate corresponding parts throughout the several views, the letter A indicates a harrow; B, the scraping mechanism for the disk thereof; and C, the novel operating means for said scraping device.

The scraping device B and the operating means C therefor can be applied to any preferred type of disk harrow, plow or the like, and the harrow or plow may be of any desired size, shape or make, and the harrow A has been merely shown by way of example to illustrate the use of the invention. As shown, the harrow A includes the frame 10, having the usual draft beam 11 connected thereto. This draft beam 11 may serve as means for permitting draft animals to be connected to the harow or as means for connecting the same to a tractor. The frame 10 includes rearwardly extending arms 12 to which are bolted the harrow beams 13. The harrow beams 13, as shown extend at an angle to the frame, and carry depending legs 14, which carry bearings 15 for the shafts 16 upon which are equi-distantly mounted the ordinary disks 17. The method of mounting the disks 17 forms no part of the present invention. As shown in the drawings the bearings engage the hubs of the disks 17 and for each gang of the disks is positioned one of the scraping devices B, and one of the operating mechanisms C therefor. Inasmuch as the operating means C and the scraping device B for each gang is formed substantially the same, only one scraping device and one operating means will be described.

The scraping device B for the disks 17 includes a longitudinally extending rocker shaft 20, which is provided at spaced points with cylindrical portions, which are mounted for rocking movement in bearings 21, carried by the rear face of the harrow beam 13. The rocker shaft 20 has secured thereto in any preferred manner boxes 22, to which are secured the scraper blades 23. The boxes 22 permit the scraper blades to move with the rocker shaft upon actuation thereof, and the blades extend downwardly and inwardly into engagement with the disks in order to effectively scrape all débris, which might adhere to the same during the use of the harrow, therefrom and thus permit effective operation thereof. As clearly shown in Figure 2 of the drawings, there is a scraper blade 23 for each one of the harrow disks 17, and all of these scraper blades 23 are operated synchronously.

The operating means C for the scraping device B includes a yoke plate 30, which is of substantially U-shaped configuration when viewed in plan. This plate is bolted or otherwise secured, as at 31 to the harrow beam 13, and the leg portions of the U-shaped yoke 30 project rearwardly therefrom, and the lower faces thereof support bearings 32 for the cam operating shaft 33, which forms an important part of the invention. This cam operating shaft 33 has mounted thereon a cam 34, which as shown has a single throw 35. This came is adapted to be normally engaged by a roller 36, which is carried by a rocker arm 37, that is secured in any preferred manner as at 38 to the rocker shaft 20 for movement therewith. It can be seen that upon movement of the cam 34, the rocker shaft 20 will be rocked to and fro owing to the nature of the cam 34. The scraper blades 23 are normally urged inwardly toward the axis of the disks 17 by means of contractile coil springs 39, which are connected respectively to certain of the scraper blades 23 and to the depending legs 14. Thus it can be seen that as the cam rotates, the scraper blade 23 will be gradually moved toward the periphery of the disks 17, and when the roller 36 rides off of the throw 35 of the cam, the blades 23 will be quickly and forcibly moved toward the axis of the disks 17 by means of the expansion spring 39.

An eccentric 40 is keyed or otherwise secured to the disk shaft 16, for rotation therewith, and this eccentric has mounted thereon an eccentric strap 41, which is made in sections and connected together by adjustable bolts 42. This permits wear to be taken up on the strap 41 and the eccentric cam 40. The cam strap 41 has formed thereon the radially extending socket 43, which carries the operating rod 44, which may be of any desired shape according to the make of disk harrow or other agricultural implement with which it is associated. The upper end of this connecting rod 44 is hooked as at 45, and is adapted to be extended through any one of a plurality of openings 46, formed in the actuating arm 47. It is preferred that this arm be made in two companion sections and bolted together by means of bolts 48 which can be extended through the openings 46. The inner ends of the sections forming the operating arms 47 are bent outwardly and inwardly to form the yoke 49, which embraces and receives the operating ratchet 50 which is keyed or otherwise secured to the cam operating shaft 33. The inner end of the arm 47 is rotatably mounted upon the cam operating shaft 33. This arm 47 has pivotally secured thereto at the yoke portion thereof a dog 51, which is adapted to engage the teeth formed on the ratchet wheel 50. The inner end of the dog 51 is normally urged into engagement with the periphery of the ratchet wheel by means of a contractile coil spring 52 which has one end connected to the dog and the other end connected to the operating crank 47. It can be seen that when the crank 47 is moved in one direction, the pawl or dog 51 will ride over the periphery of the ratchet teeth, but when the same is moved in the opposite direction, the same will catch in the ratchet teeth and thus move the ratchet wheel 50. In order to prevent retrograde movement of the ratchet wheel 50, a second pawl 55 is provided. This pawl 55 is pivotally mounted intermediate its ends upon a pin 56, which can be carried, by a suitable portion of the U-shaped yoke 30. This pawl 55 is located substantially diametrically opposite the dog 51 and is arranged in opposite directions thereto in order to prevent movement of the ratchet wheel when the dog 51 is sliding over the periphery of the ratchet wheel.

In operation of the improved operating mechanism, the crank arm 47 will be moved up and down by the connecting rod 44, through the medium of the eccentric 40. Upon upward movement of the crank arm 47, the dog 51 will slide over the ratchet teeth, but upon downward movement of the arm the dog will catch in said teeth and thus turn the cam operating shaft 33. This cam will, in turn, oscillate the rocker arm 37 and thus move the scraper blades 23 back and forth across the disks 17, and as heretofore described.

The rate of speed of operating the rocker arm 37 can be readily regulated by inserting the hooked end 45 of the connecting rod 44 in any one of the openings 46. In order to prevent the displacing of the hooked end 45 of the connecting rod 44 from out of the opening, a suitable cotter pin 45′ can be inserted through the hooked end. The rate of speed of operation of the rocker arm 37 can also be governed by different sizes and shapes of cams, which are clearly shown in Figures 8 and 9 of the drawings. In Figure 8 is shown a cam 60 having three points or throws 61, while in Figure 9 is shown a cam 70 having two points or throws 71.

In order to prevent lateral movement of the eccentric 40 upon the shaft 16, the same can be extended the entire distance between a pair of the disks 17, and mud guard caps 80 can be provided for the ends of the cams so as to abut the disks, and to prevent the cam from being clogged with débris. As shown the caps 80 are provided with inturned guard flanges 81.

From the foregoing description, it can be seen that an exceptionally simple and durable device has been provided for automatically and positively operating the scraper blades for keeping the disks of a harrow or other agricultural implement free from all débris. The mode of imparting movement to the scraper arms is a novel part of the device, as the slow movement of the scraper blades toward the periphery of the disk and then the quick forcible movement on the return stroke of scraper blades toward the axis of the disks insures the knocking and freeing of all débris from the disks.

Changes in details may be made without departing from the spirit or scope of this invention; but,

I claim:

1. In an agricultural implement, a disk shaft, a disk upon the shaft, a rocker shaft, a scraper blade carried by the rocker shaft and arranged for movement toward and away from the axis of the disk, and means for positively and automatically operating said rocker shaft from the disk shaft.

2. In an agricultural machine, a frame, a disk shaft rotatably carried by the frame, a disk upon the shaft, a rocker arm, a scraper blade carried by the rocker arm and arranged for movement over one face of the disk, and means for positively and automatically swinging the rocker shaft from the disk shaft for slow movement in one direction and for quick movement in the opposite direction.

3. In an agricultural implement, a frame, a disk shaft, a plurality of disks mounted upon the shaft, a rocker shaft, a plurality of scraper blades mounted upon the rocker shaft for movement over one face of the disks, an operating mechanism disposed between the disk shaft and the rocker shaft for imparting a slow gradual movement to the shaft in one direction, and a quick forcible movement of the shaft in the opposite direction.

4. In an agricultural implement, a frame a disk shaft, a plurality of disks mounted upon the shaft, a rocker shaft, a plurality of scraper blades secured to the rocker shaft for movement therewith and for movement over one face of the disks, a cam operating shaft, a cam upon said shaft, a rocker arm secured to the rocker shaft and arranged to engage the periphery of the cam, and means for imparting rotary movement to the cam shaft from the disk shaft.

5. In an agricultural implement, a frame, a disk shaft, a plurality of disks upon the shaft, a rocker shaft, a plurality of scraper blades secured to the rocker shaft for movement therewith and for movement over one face of the disks, a rotatable cam shaft, a cam carried by the shaft having an abrupt throw, a rocker arm secured to the rocker shaft engaging the periphery of the cam, an eccentric mounted upon the disk shaft, and means operatively connecting the eccentric to the cam shaft for imparting movement to the cam shaft in one direction.

6. In an agricultural implement, a frame, means mounted upon the frame, rocker shafts carried by the beam, a disk shaft carried by each one of the beams, a plurality of scraper blades carried by each one of the rocker shafts, an operating mechanism for each rocker shaft carried by each beam including a supporting frame, a cam operating shaft carried by the frame, a cam upon said cam shaft, a rocker arm secured to each rocker shaft for engaging the periphery of the cams, a ratchet wheel secured to each one of the cam shafts, a crank arm rotatably carried by each one of the cam shafts, a pivoted dog carried by the crank arm for engaging the ratchet wheels, an eccentric mounted upon each one of the disk shafts, and rods connecting the eccentrics with the crank arms.

7. In an agricultural implement, a frame, a beam carried by the frame, depending legs secured to the beam, a disk shaft rotatably mounted upon the legs, bearings carried by the beams, a rocker shaft mounted in said bearings, a plurality of depending scraper blades secured to the rocker shaft for movement over one face of the disks, a U-shaped attaching plate secured to the beam, bearings carried by the plate, a cam shaft rotatably carried by the last mentioned bearings, a cam secured to said shaft for movement therewith having a relatively abrupt throw, a rocker arm secured to the rocker shaft, a roller carried by the free end of the rocker arm and engaging the periphery of the cam, resilient means connecting certain of the scraper blades with the frame for normally retaining the scraper blades toward the axis of the disks, a ratchet wheel rotatably mounted upon the cam shaft, a crank arm rotatably mounted upon the cam shaft, a pawl pivotally secured intermediate its ends to the crank arm engaging the periphery of the ratchet wheel, a second pawl carried by the attaching plate arranged to engage the ratchet wheel to prevent retrograde movement thereof, an eccentric carried by the disk shaft, a strap surrounding said eccentric, and a connecting rod connecting said strap with said crank arm.

8. In an agricultural implement, a frame, a beam carried by the frame, depending legs secured to the beam, a disk shaft rotatably mounted upon the legs, bearings carried by the beam, a rocker shaft mounted in said bearings, a plurality of depending scraper blades secured to the rocker shaft for movement over one face of the disks, a U-shaped attaching plate secured to the beam, bearings carried by a plate, a cam shaft rotatably carried by the last mentioned bearings, a cam secured to said shaft for movement therewith having a relatively abrupt throw, a rocker arm secured to the rocker shaft, a roller carried by the free end of the rocker arm and engaging the periphery of the cam, resilient means connecting certain of the scraper blades with the frame for normally retaining the scraper blades toward the axis of the disks, a ratchet wheel rotatably mounted upon the cam shaft, a crank arm rotatably mounted upon the cam shaft, a pawl pivotally secured intermediate its ends to the crank arm engaging the periphery of the ratchet wheel, a second pawl carried by the attaching plate arranged to engage the ratchet wheel to prevent retrograde movement thereof, an eccentric carried by the disk shaft, a strap surrounding said eccentric, and a connecting rod connecting said strap with said crank arm, said crank arm having a plurality of spaced openings formed therein throughout its entire length to permit the connecting rod to be secured thereto at any point.

JOHN KAMMEYER.